US012574367B2

(12) United States Patent
Esen et al.

(10) Patent No.: US 12,574,367 B2
(45) Date of Patent: Mar. 10, 2026

(54) ESTABLISHING A DATA SUBSCRIPTION FOR UTILITY USAGE INFORMATION

(71) Applicant: Apple Inc., Cupertino, CA (US)

(72) Inventors: Atakan Esen, San Diego, CA (US); Andrew M. Pace, Gloucestershire (GB); Brian J. Tucker, Sunnyvale, CA (US); Jacob D. Hansen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 51 days.

(21) Appl. No.: 18/898,536

(22) Filed: Sep. 26, 2024

(65) Prior Publication Data

US 2025/0343788 A1     Nov. 6, 2025

Related U.S. Application Data

(60) Provisional application No. 63/643,364, filed on May 6, 2024.

(51) Int. Cl.
 *H04L 29/06* (2006.01)
 *H04L 9/40* (2022.01)

(52) U.S. Cl.
 CPC .................................. *H04L 63/083* (2013.01)

(58) Field of Classification Search
 CPC ...................................................... H04L 63/083
 See application file for complete search history.

(56) References Cited

U.S. PATENT DOCUMENTS

| 2012/0008786 | A1* | 1/2012 | Cronk | ..................... G06F 21/10 |
| | | | | 726/28 |
| 2013/0014281 | A1* | 1/2013 | Cheah | ................ G06Q 30/0251 |
| | | | | 726/28 |
| 2014/0040343 | A1* | 2/2014 | Nickolov | .............. H04L 67/101 |
| | | | | 709/201 |

\* cited by examiner

*Primary Examiner* — Wasika Nipa
(74) *Attorney, Agent, or Firm* — BAKERHOSTETLER

(57) ABSTRACT

Aspects of the subject technology provide for establishing at a user device, as subscription for utility usage data from a utility provider at a server of the utility provider. The subscription may be handled by an intermediary server and data provided to the user device from the intermediary server. Various authentication and validation steps can be made to ensure that the user attempting to subscribe to the utility usage data corresponds to the customer of the utility provider.

20 Claims, 8 Drawing Sheets

100

120

110

130

CLIENT SERVER

106

NETWORK

140

UTILITY SERVER

400

| 402 |
| --- |
| RECEIVE, AT A DEVICE, A USER REQUEST TO SUBSCRIBE TO A USAGE-DATA SHARING SUBSCRIPTION FOR A THIRD-PARTY UTILITY SERVER, THE USER REQUEST BEING ASSOCIATED WITH A USER DEVICE ACCOUNT |

| 404 |
| --- |
| RECEIVE, AT THE DEVICE FROM A CLIENT SERVER, FIRST USER INFORMATION |

| 406 |
| --- |
| PROVIDE, FROM THE DEVICE TO THE UTILITY SERVER, THE FIRST USER INFORMATION |

| 408 |
| --- |
| BASED AT LEAST IN PART ON A VALIDATION THAT THE FIRST USER INFORMATION CORRESPONDS TO A USER IDENTITY ASSOCIATED WITH THE USER DEVICE ACCOUNT, RECEIVE A REQUEST FOR ADDITIONAL INFORMATION FROM THE UTILITY SERVER |

| 410 |
| --- |
| PROVIDE, BY THE DEVICE AND TO THE UTILITY SERVER, THE ADDITIONAL INFORMATION FOR VERIFYING THAT THE USER IDENTITY IS ASSOCIATED WITH A UTILITY ACCOUNT ASSOCIATED WITH THE UTILITY SERVER |

| 412 |
| --- |
| BASED ON A VERIFICATION OF THE UTILITY SERVER THAT THE DEVICE CORRESPONDS TO THE USER IDENTITY, RECEIVE, FROM THE UTILITY SERVER, AN AUTHORIZATION FOR THE USAGE-DATA SHARING SUBSCRIPTION CORRESPONDING TO THE USER IDENTITY |

| 414 |
| --- |
| RECEIVE, AT THE DEVICE, UTILITY USAGE INFORMATION FOR THE UTILITY ACCOUNT |

*FIG. 4*

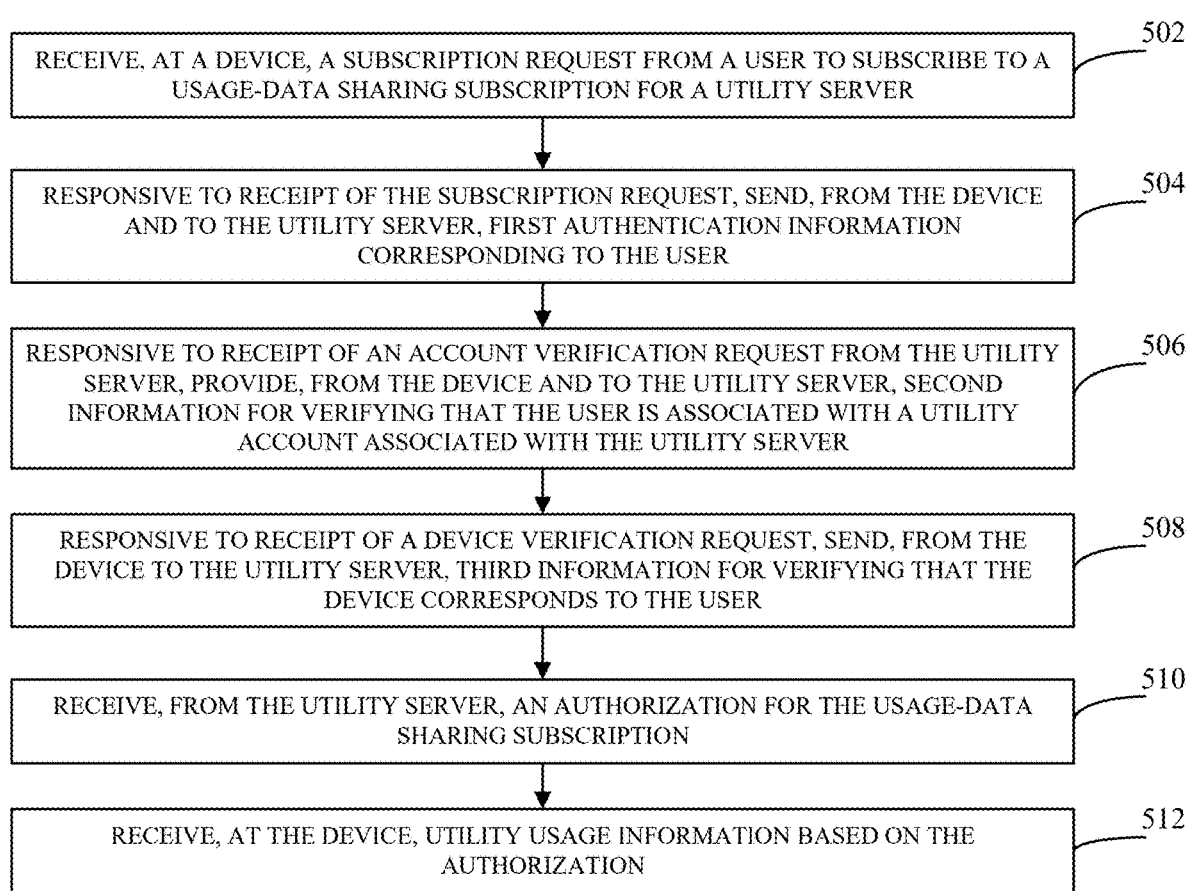

500

RECEIVE, AT A DEVICE, A SUBSCRIPTION REQUEST FROM A USER TO SUBSCRIBE TO A USAGE-DATA SHARING SUBSCRIPTION FOR A UTILITY SERVER — 502

RESPONSIVE TO RECEIPT OF THE SUBSCRIPTION REQUEST, SEND, FROM THE DEVICE AND TO THE UTILITY SERVER, FIRST AUTHENTICATION INFORMATION CORRESPONDING TO THE USER — 504

RESPONSIVE TO RECEIPT OF AN ACCOUNT VERIFICATION REQUEST FROM THE UTILITY SERVER, PROVIDE, FROM THE DEVICE AND TO THE UTILITY SERVER, SECOND INFORMATION FOR VERIFYING THAT THE USER IS ASSOCIATED WITH A UTILITY ACCOUNT ASSOCIATED WITH THE UTILITY SERVER — 506

RESPONSIVE TO RECEIPT OF A DEVICE VERIFICATION REQUEST, SEND, FROM THE DEVICE TO THE UTILITY SERVER, THIRD INFORMATION FOR VERIFYING THAT THE DEVICE CORRESPONDS TO THE USER — 508

RECEIVE, FROM THE UTILITY SERVER, AN AUTHORIZATION FOR THE USAGE-DATA SHARING SUBSCRIPTION — 510

RECEIVE, AT THE DEVICE, UTILITY USAGE INFORMATION BASED ON THE AUTHORIZATION — 512

*FIG. 5*

ESTABLISHING A DATA SUBSCRIPTION FOR UTILITY USAGE INFORMATION

CROSS REFERENCE TO RELATED APPLICATIONS

This application claims the benefit of U.S. Provisional Application No. 63/643,364, entitled "ESTABLISHING A DATA SUBSCRIPTION FOR UTILITY USAGE INFOR-MATION," filed May 6, 2024, the entirety of which is incorporated herein by reference.

TECHNICAL FIELD

The present description relates generally to electronic devices, including, for example, utilizing an electronic device to initiate a subscription for utility usage information

BACKGROUND

As the world becomes more energy-aware and the cost of energy has increased, it has become desirable to some people to obtain and track utility usage information at, for example, their place of residence. On the utility provider side, generally utility providers welcome customer engage-ment in exploring usage tracking and usage cutting tech-niques to reduce pressure on utility transmission channels.

BRIEF DESCRIPTION OF THE DRAWINGS

Certain features of the subject technology are set forth in the appended claims. However, for purpose of explanation, several embodiments of the subject technology are set forth in the following figures.

FIG. 4 illustrates a flow diagram of an example process for setting up a subscription to utility usage information, in accordance with one or more implementations.

FIG. 5 illustrates a flow diagram of an example process for setting up a subscription to utility usage information, in accordance with one or more implementations.

DETAILED DESCRIPTION

The detailed description set forth below is intended as a description of various configurations of the subject technol-ogy and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, struc-tures and components are shown in block diagram form in order to avoid obscuring the concepts of the subject tech-nology.

Many users of various electronic devices rent or own a home that uses utilities, such as one or more of electricity, water, and gas. A subset of such users may utilize their electronic devices to log into a customer website or cus-tomer portal operated by the utility provider. At such cus-tomer websites, customers can view data about their usage and bills. Some customers never bother to set up their customer access to these customer portals and so do not receive usage information other than what is provided on a bill received at their mailing address or email address.

Aspects of the subject technology provide a mechanism for customers of utility providers to use their electronic devices (e.g., user devices) to subscribe to a usage data sharing service which can obtain utility usage information corresponding to the customer from a utility provider and supply that usage information eventually to the customer's device. Aspects of the subject technology further provide the ability for the utility customers to subscribe to the usage data sharing service without having to go through a customer portal of the utility provider. Indeed, in some aspects, customers accessing usage data may not even have an online account set up with the utility provider at the customer portal. The handling of private or sensitive data is consid-ered in this process of accessing utility usage data. As such, permissions and authentication to access the utility usage data are also addressed by implementation by the subject technology.

Therefore, the subject technology advantageously improves access to and management of access to utility usage information via a user's device. This provides a solution to the inherently technical problem of authenticat-ing a user device and authorizing the user device to access data located at a server. The solution to these issues described herein includes the use of an intermediary server which collects data from the utility server in a privacy preserving manner and provides the data to the user device in a privacy preserving manner.

Figure 1:
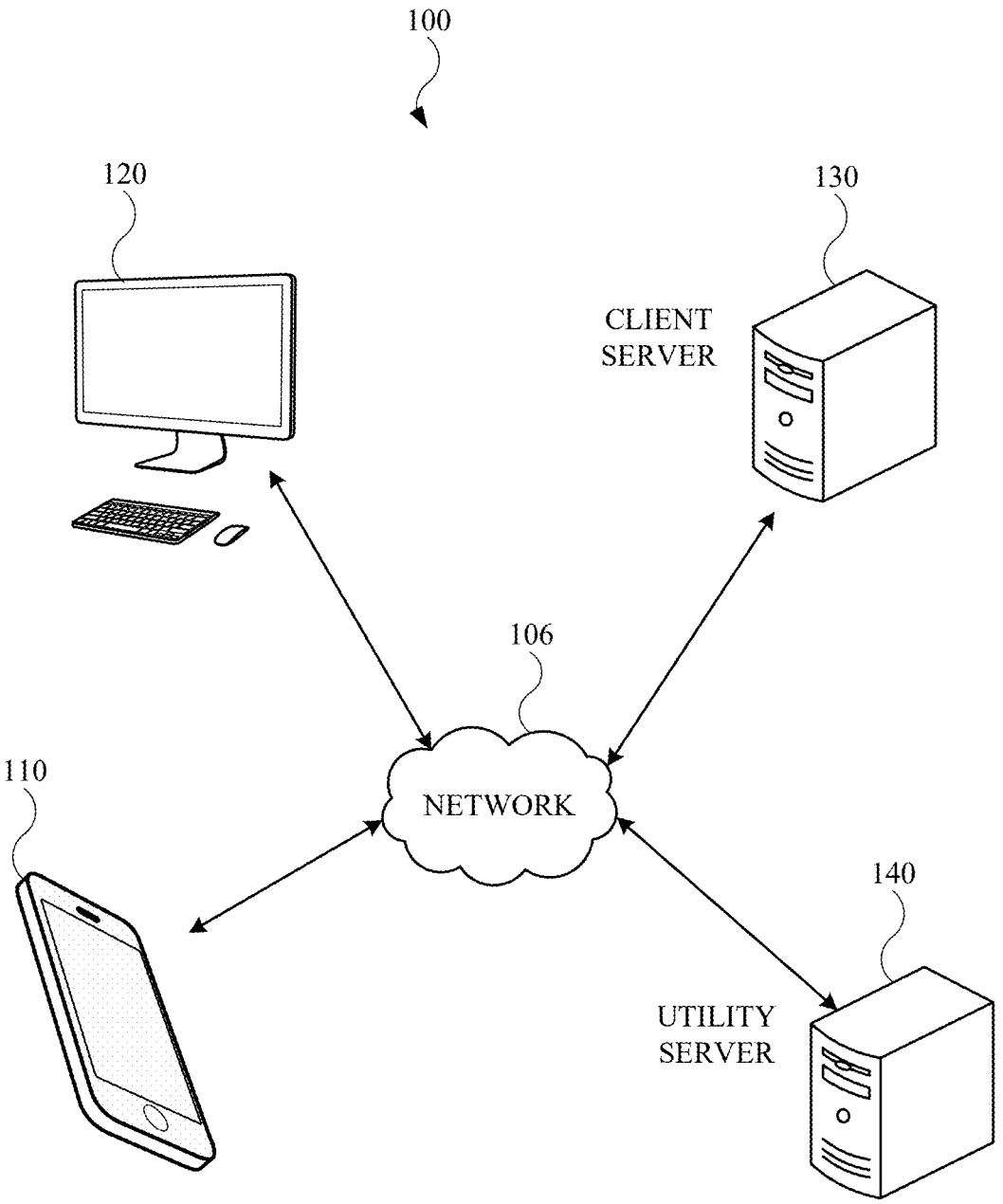
FIG. 1 illustrates a diagram of various example electronic user devices that may implement aspects of the subject technology in accordance with one or more implementa-tions.

FIG. 1 illustrates an example network environment 100 in accordance with one or more implementations. Not all of the depicted components may be used in all implementations, however, and one or more implementations may include additional or different components than those shown in the figure. Variations in the arrangement and type of the com-ponents may be made without departing from the spirit or scope of the claims as set forth herein. Additional compo-nents, different components, or fewer components may be provided.

The network environment 100 includes a user device 110, a user device 120, an intermediary server 130, and a utility server 140. The network 106 may communicatively (directly or indirectly) couple the user device 110 and/or the user device 120 to the intermediary server 130 and/or the utility server 140. In one or more implementations, the network 106 may be an interconnected network of devices that may include, or may be communicatively coupled to, the Inter-net. For explanatory purposes, the network environment 100 is illustrated in FIG. 1 as including the user device 110, the user device 120, the intermediary server 130, and the utility server 140; however, the network environment 100 may include any number of user devices and any number of servers or a data center including multiple servers. In particular, in some implementations, the intermediary server 130 and/or the utility server 140 are representative of an array of servers which may be geographically diverse. In some implementations one or more of the user devices 110 and/or user devices 120 may not be connected to the network 106, but may be tethered to one of the other user devices 110 and/or 120 wirelessly or by a wired connection.

The user device 110 may be, for example, a desktop computer, a portable computing device such as a laptop computer, a smartphone, a peripheral device (e.g., a digital camera, headphones), a tablet device, a wearable device such as a watch, and the like. In FIG. 1, by way of example, the user device 110 is depicted as a mobile user device (e.g., smartphone). The user device 110 may be, and/or may include all or part of, the electronic system discussed below with respect to FIG. 6.

The user device 120 may be, for example, desktop computer, a portable computing device such as a laptop computer, a smartphone, a peripheral device (e.g., a digital camera, headphones), a tablet device, or a wearable device such as a head mountable portable system, that includes a display system capable of presenting a visualization of an extended reality environment to a user. In FIG. 1, by way of example, the user device 120 is depicted as a desktop computer. The user device 120 may be, and/or may include all or part of, the electronic system discussed below with respect to FIG. 6.

In one or more implementations, one or more of the user devices 110 and/or 120 may have an application thereon with a user interface for connecting to a utility server to obtain a subscription to utility usage information provided by the utility server to an intermediary server. The application may interact with the intermediary server 130 for some processes of obtaining a subscription and may interact with the utility server 140 for some processes of obtaining the subscription. The interaction between the application and the intermediary server 130 may include the exchange of personal information relevant to a user account associated with the intermediary server 130. The interaction between the application and the utility server 140 may include the exchange of personal information relevant to a user account associated with the utility server 140 for the same user. The personal information in the one domain is handled in a privacy preserving way with respect to the other domain.

The intermediary server 130 may form all or part of a network of computers or a group of servers (where the intermediary server 130 is representative of such a group of servers), such as in a cloud computing or data center implementation. For example, the intermediary server 130 stores data and software, and includes specific hardware (e.g., processors, graphics processors and other specialized or custom processors) for rendering and generating content such as graphics, images, video, audio and multi-media files. In an implementation, the intermediary server 130 may function as a subscription data manager server which interacts with the utility server 140 to receive or request subscription data, organize the subscription data, and provide the subscription data to the user devices 110 and/or 120. The intermediary server 130 may be, and/or may include all or part of, the electronic system discussed below with respect to FIG. 6.

The utility server 140 may form all or part of a network of computers or a group of servers (where the utility server 140 is representative of such a group of servers), such as in a cloud computing or data center implementation. For example, the utility server 140 stores data and software, and includes specific hardware (e.g., processors, graphics processors and other specialized or custom processors) for rendering and generating content such as graphics, images, video, audio and multi-media files. In an implementation, the utility server 140 is associated with a utility provider where a user maintains a utility account and where usage data is available for the user utility account, and the utility server 140 may function to authenticate the user device 110 and/or 120 to receive utility usage information for the user associated both with the user device 110 and/or 120 as well as the utility provider. In an implementation, the utility server 140 may provide anonymized utility usage data to the intermediary server 130 according to a subscription authentication set up between the user device 110 and/or 120. The utility server 140 may be, and/or may include all or part of, the electronic system discussed below with respect to FIG. 6.

In the example of FIG. 1, each of the user devices 110 and 120 are depicted as a particular type of device, e.g., smartphone and desktop or portable computer. However, it is appreciated that each of the user devices 110 and 120 may be implemented as another type of device, such as a wearable device (e.g., a smart watch or other wearable device). The user devices 110 and/or 120 may be a device of a user (e.g., the user devices 110 and/or 120 may be associated with and/or logged into a user account for the user at a server, such as the intermediary server 130).

Figure 2A:
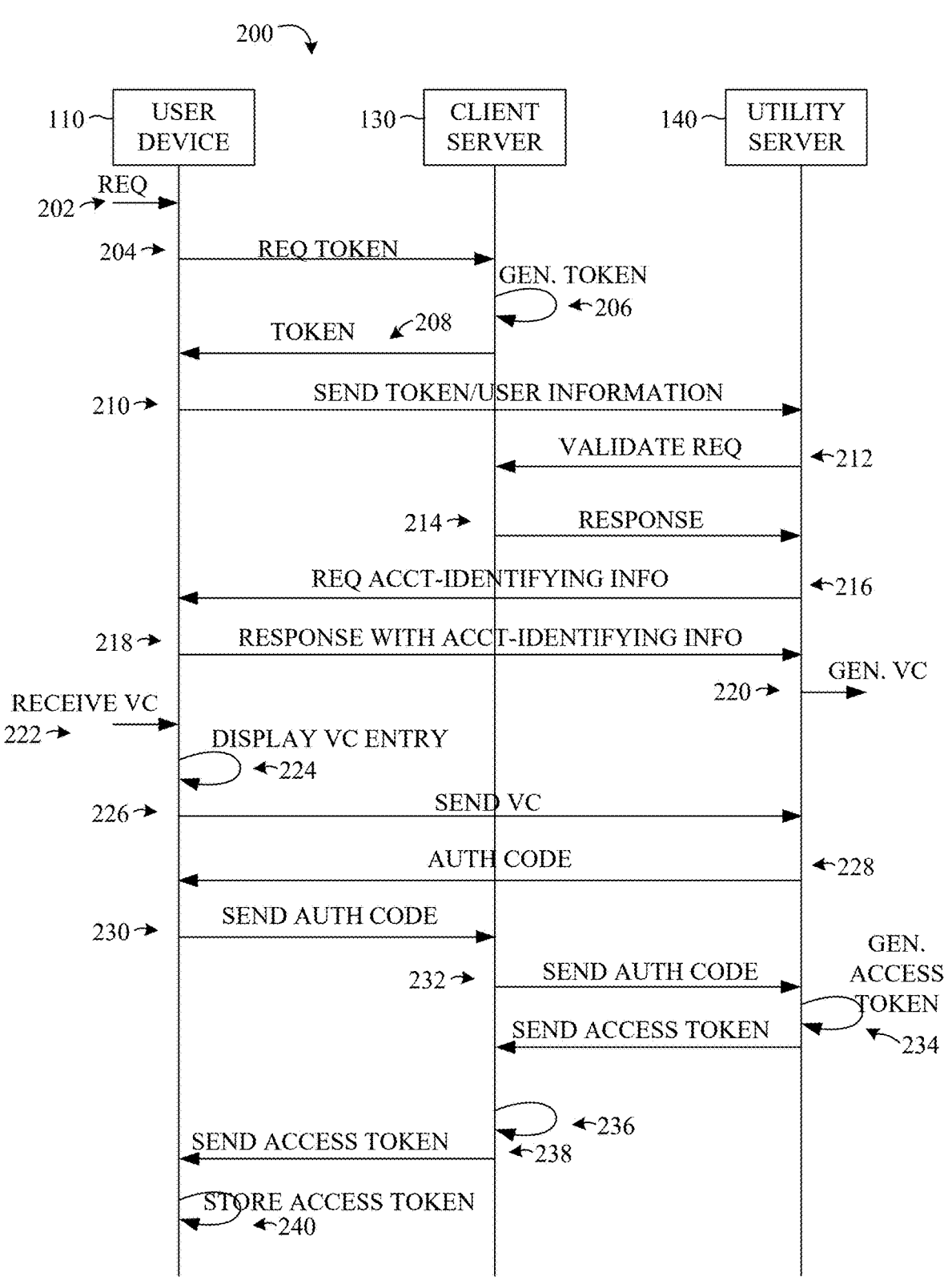
FIGS. 2A-2B illustrate a data flow between a device, an intermediary server, and a utility server for setting up a subscription for utility usage information in accordance with one or more implementations.
Figure 2B:
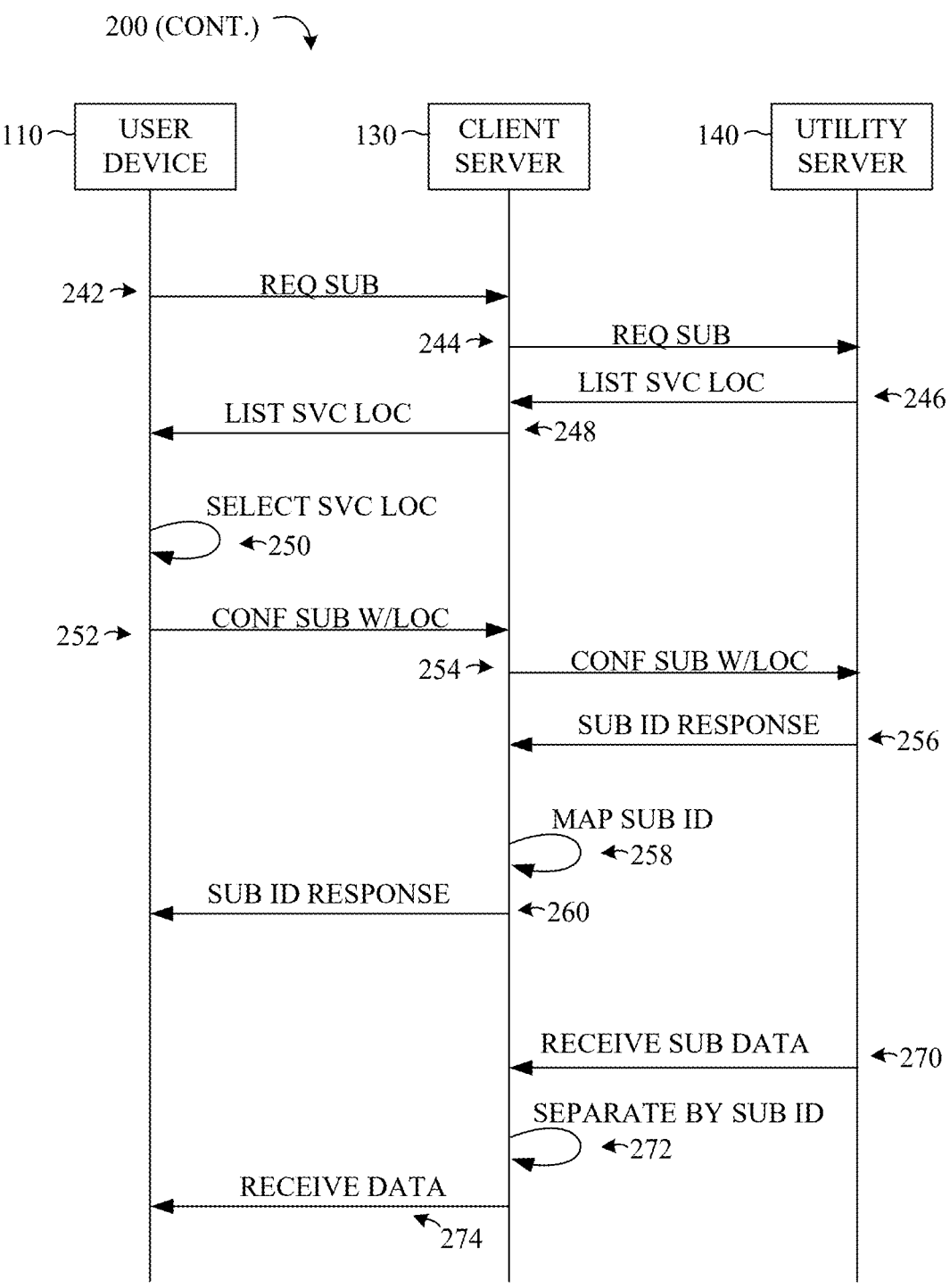

FIGS. 2A and 2B illustrate data flow 200 between a user device 110, an intermediary server 130, and a utility server 140 for registering the user device 110 to receive a subscription for utility usage information from the utility server 140 in accordance with some implementations. For the sake of simplicity, unless otherwise noted, where the description below refers to the user device 110, it should be understood that the user device 120 may be used. The intermediary server 130 may be an intermediary server such as the intermediary server 130 described above. The utility server 140 may be utility server such as the utility server 140 described above. It should be appreciated that more or fewer data exchanges between the user device 110, the intermediary server 130, and the utility server 140 may be used than those described herein. For example, some data exchanges may be optional and some data exchanges may be repeated if, for example, the data exchange fails for whatever reason. For the sake of simplicity, unless otherwise noted, an action taken at the user device 110 should be understood to be taken by accessing an application installed on the user device 110 or a system setting or configuration of the user device 110. In some implementations the application may be an add-on application, such as installed from an application store and developed by a third-party. In other implementations the application may be a native application, such as an application provided by the device manufacturer.

At 202, the user device 110 receives a request at the user device 110 for setting up access at the user device 110 to receive utility usage information from a utility provider for a customer of the utility provider where the customer of the utility provider is the same individual as the user of the user device 110. The user of the user device 110 may be logged into the user device 110 or to an application running on the user device 110 using credentials which are tied to a user account associated with the user device 110 or the application running on the user device 110. The same user account may also be associated with the intermediary server 130. The request can come to the user device 110, for example, from the user of the device by launching an application or a configuration setting of the user device 110 and selecting an option to set up a subscription for utility usage information.

At 204, a token is requested by the user device 110 from the intermediary server 130. As noted above, the intermediary server 130 may include a collection of servers, for example, on the same physical device or on separate devices under the control of the same entity. One of such servers may be a second server including an authorization server which generates the token and ultimately provides the token to the user device 110 either directly or through another one of the servers of the intermediary server 130. Thus, at 206, the token is generated by the intermediary server 130, and at 208, the token is provided from the intermediary server 130 to the user device 110. Obtaining a token in this manner is optional in some implementations. The token may represent that the user device or the user account associated with the device is also associated with the intermediary server 130. For example, the token may represent that some user information associated with the user account at the intermediary server 130 has been verified. The token itself may include some encrypted data which may include some encrypted personal information, some encrypted account information for the user account, or some encrypted device information for the user device 110 associated with the intermediary server 130. By generating and sending the token to the user device 110 from the intermediary server 130, the intermediary server 130 is signaling that the user, the user device, and/or the account associated with the user are verified and/or trusted. This can help prevent the utility server 140 from being bombarded with invalid requests or phishing attempts.

At 210, if a token is received then the token can be sent from the user device 110 directly to the utility server 140. If the token is not used, then other user information can be sent to the utility server 140. For example, the user information sent to the utility server 140 may be the phone number associated with the mobile device, if the user device 110 is a mobile device, or may be a user identifier (ID) associated with the user account corresponding to the intermediary server 130.

At 212, the utility server 140 can validate the token or user information. In some implementations, the validation can be performed by using a public key to verify the cryptographic signature of the token to determine that the token is valid or use a private key to decrypt the token to verify that the token was valid. In other implementations, such as that provided for in FIGS. 2A and 2B, the token or user information can be provided to the intermediary server 130 from the utility server 140.

At 214, the intermediary server 130 can verify the token (if a token was used) and return a response to the utility server 140 that the information was valid. This in-turn establishes that the request (at 202) is allowed to proceed. To verify the token, the intermediary server 130 can use the public key to verify the token or can use a private key to decrypt the token (since it issued the token at 206). If the verification passes, then the flow can proceed to 216, otherwise, an alternative flow can be utilized to set up the subscription service for utility data. In other implementations, for example, if the user provided user information to the utility server 140 rather than a token, the intermediary server 130 can verify the user information (e.g., such as a user ID, phone number, account number, or the like), by utilizing the user information to determine if the information provided matches records associated with the intermediary server 130.

At 216, the utility server 140 can provide requests for account-identifying information for the user to provide at the user device 110. The request for account-identifying information may be provided either directly to the user device 110 or to the intermediary server 130, which can then provide the request for account-identifying information to the user device 110. The request for account-identifying information establishes a fingerprint identification by having the user device 110 respond to the request for account-identifying information back to the utility server 140 to provide information to the utility server 140 which is associated with the customer account at the utility server 140. For example, the utility server 140 may query the user device 110 for information found on the most recent billing statement, information regarding payment methods or amounts for the most recent payment to the utility account, information regarding length of service, information regarding a meter serial number associated with the account, information regarding an email address, phone number, or other contact information of the customer, so forth, and combinations thereof. Such information may only be known at the utility server 140 and by the user associated with the user device 110. The questions can be displayed at the user device 110, thereby prompting the user to answer the questions.

In some implementations, the intermediary server 130 and utility server 140 can have an agreement to provide to the user device 110, from the intermediary server 130, the request for account-identifying information. The request for account-identifying information, for example, may be from a pool of questions by prearrangement between the intermediary server 130 and the utility server 140. The user device can provide to the user pre-filled information in the fields corresponding to the request for account-identifying information. The information which is pre-filled may, for example, be stored at the user device and be associated with user contact information stored at the user device, such as email, phone, address, and so forth. The user may modify the pre-filled data with different data, for example, if the user's utility account uses an alternative phone number or email address and so forth. Notably, the request for account-identifying information may not provide masked user data for the user to verify or select from, but provides prompts for the user to provide identifying information for the user device 110 to send directly back to the utility sever 140.

At 218, the user device 110 can send the responses for the request for account-identifying information to the utility server 140. Because the answers to the questions may contain sensitive or personal information, the responses can be sent directly to the utility server 140, rather than, for example, the intermediary server 130. This protection of sensitive or personal information ensures the intermediary server 130 does not access such information when it is not needed.

In some implementations, the steps 210 and 218 can be performed in the same operation. Recall that the request for account-identifying information at 216 may include a request for certain information by a prearrangement between the intermediary server 130 and utility server 140. In such instances, rather than send the token and get permission to proceed from the utility server 140, the intermediary server 130 can prompt the user device 110 for the account-identifying information at 216, then when the user device 110 sends the response with the account-identifying information at 218, the user device 110 can also send the token information at 210. The token can be validated at 212/214 along with the account-identifying information to determine and validate the customer associated with the utility server 140 and user device 110. In one or more implementations, one or more of 216 and/or 218 may include a one-time passcode verification.

At 220, after the utility server 140 receives the responses from the user device 110 to the request for account-identifying information, the utility server 140 can identify the user account and verify the supplied user account information for the utility customer using the provided account-identifying information to verify the user (e.g., the identity of the user). After identifying the user account associated with the utility server 140 and verifying that the information provided in the account-identifying information matches the account information stored at the utility server 140 to verify the user identity, the utility server 140 can generate a validation code and send the validation code to the user of the user device 110. The validation code can be used to separately verify that the customer of the utility server 140 and/or user device 110 is authenticating with the utility server 140. In some implementations this may be optional.

In some implementations, generating and sending the validation code may include prompting the user device to choose a delivery mode for the validation code. For example, the user may be prompted to choose to send the code to the email address or phone number associated with their utility account 140. The validation code can be a one-time code or other type of code that can be generated and sent from the utility server 140 to the user of the user device 110. The validation code can be sent to a trusted contact information for the user, for example, selected from the customer record of the utility server 140 that corresponds to the user. Thus, in some implementations, the validation code can be sent to the user and/or user device 110 through a communication mechanism other than the communication mechanism by which the other messages are being sent. For example, if the user device 110 is a smart phone which is interacting with the utility server 140 by accessing an application or configuration setting on the user device 110, then a communication mechanism other than the interface of the application or configuration setting may be email, text message, or a system notification. Notably, the same user device 110 can receive the validation code except through a different application or unlocking. In some implementations, the validation code can be provided to a device other than the user device 110. For example, the validation code can be sent as a voice call to a phone number associated with the customer account at the utility server 140 or may be received in email on another device other than the user device 110.

At 222, the validation code can be received by the user and/or at the user device 110, for example, by an application or system process of the user device 110, when received at the user device 110. Then, at 224, an entry or prompt can be provided or displayed at the user device 110 for the user to enter the validation code received at the user device 110. In some implementations, the entry or prompt can be provided or displayed at the user device 110 prior to receiving the validation code. Receiving the validation code at the user device 110, at 222, can include the user providing the code to the user device 110, where the user receives the validation code at the user device 110 or at another device. At 226, the user device 110 sends the validation code back to the utility server 140 to complete the authentication of the user and/or user device 110 to the utility server 140.

After the validation code is verified, the process can continue to 228 or can skip to 234. The steps 228 to 232 can be performed to support some legacy systems that use authorization codes. In such systems, at 228, the utility server 140 can send an authorization code to the user device 110. The authorization code signifies that the process described to this point has been completed. Essentially, the authorization code signifies that the subscription is ready to be set up and that the bearer of the authorization code has the authorization to access the subscription data. That is, after the completion of the data flow 200 up through 226, the user has been validated by both the intermediary server 130 and the utility server 140. Also, the user device 110 has optionally been authenticated or verified that it belongs to the customer of the utility server 140. The remaining elements of FIGS. 2A and 2B are provided for setting up the subscription. A particular implementation for doing this is described below, however, it should be appreciated that other approaches may be used. One of the considerations involved in this process is that the subject technology may establish a subscription model where the subscription may be revoked by any of the parties involve. As such, as a part of establishing the subscription an access token is used to maintain permissions between the various device elements (e.g., user device 110, intermediary server 130, and utility server 140) to interact with each other without having to reauthenticate or revalidate.

Aspects of the subject technology provide that the utility companies provide the utility usage information to the intermediary server 130 and then the intermediary server 130 provides the usage information to the user device 110, rather than have the utility server 140 provide the utility usage information directly to the user device 110. There are several advantages to implementing the subscription model as provided for in the subject technology. One advantage is that the user associated with the user device 110 can access utility usage information for their customer account(s) without needing online access to a customer portal of the utility server 140. Further, the user can obtain aggregated data from multiple utilities providers at the intermediary server 130 (since each utility server 140 is different for each different utility provider). Another advantage is that if the utility provider sent utility usage information directly to the user devices 110, then the utility server 140 would be managing the provision of the data to each user device 110. By utilizing the intermediary server 130 as an intermediary, the management burden on the utility server 140 is less. Another advantage is that the intermediary server 130 may be able to aggregate data in an anonymized way from multiple utility providers across many servicing areas. This gathered data can be used to help understand energy needs in various servicing areas. It should be understood that this data could be gathered in a way that protects the privacy of personal information associated with the data. It should also be understood that this data would be gathered and collected with permission.

After receiving the authorization code at the user device 110, at 230, the user device 110 sends the authorization code to the intermediary server 130, which sends, at 232, the authorization code to the utility server 140. Receiving the authorization code back at the utility server 140 indicates that the user device 110 and the intermediary server 130 have permission to access the utility usage information at the utility server 140.

As noted above, 234 may proceed after the verification of the validation code received at the utility server 140 or may proceed after verifying the authorization code following 232. As such, at 234, the utility server 140 generates an access token and provides the access token to the intermediary server 130. The intermediary server 130 stores the access token at 236 and provides, at 238 the access token to the user device 110. In one or more implementations, the access token may be temporarily stored on the intermediary server 130, until it can be delivered to the user device 110. The user device 110 stores the access token at 240. In some implementations, to further heighten security of the access user data, the access token is provided directly to the user device 110 from the utility server 140 and not sent to or stored by the intermediary server 130.

In FIG. 2B, the data flow 200 continues. With the access token procured, the user device 110, at 242, requests a subscription from the intermediary server 130. Then, the intermediary server 130, in turn at 244, requests a subscription from the utility server 140. The utility server 140 can check the customer account (the customer account being tied to the access token) to determine if multiple services are provided for the customer account. For example, if the utility service is an electricity provider, then the customer of the electricity provider may have multiple service addresses and/or multiple electric meters associated with their account. In such instances, at 246, the list of service locations and/or service meters may be provided to the intermediary server 130.

At 248, the list of service locations and/or meters can be provided to the user device 110. The user device 110 may display to the user the list of service locations and/or meters associated with their customer account and provide an interface to allow the user to select one or more locations to add to obtain the utility usage data from.

At 250, the user may make a selection at the user device 110 for which of the service locations and/or meters to subscribe to utility usage information. In some implementations, the user must pick a single service location and/or meter, and in other implementations, the user can pick several locations and/or meters. In some implementations, the ability to pick one or multiple service locations and/or meters may be based on a service level the user has with the intermediary server 130 and/or utility server 140.

At 252, the user's selection(s) may be sent to the intermediary server 130 from the user device 110 and the intermediary server can, at 254, send the user's selection(s) to the utility server 140. The utility server 140 can assign a subscription ID to the customer and tie the subscription ID to the selected service location and/or meter for utility usage data monitoring as well as to the access token. It should be understood that if the customer only has one service location and/or meter, then the process elements of 246-254 may be omitted and the utility server 140 can tie the subscription ID to the only service location and/or meter available as a default process as well as to the access token.

At 256, the subscription ID is sent from the utility server 140 to the intermediary server 130. At 258, the intermediary server 130 associates the subscription ID in some manner to the user. This may be accomplished in a variety of ways. For example, the subscription ID may be associated with a user account corresponding to the user, in one implementation. In another implementation, however, it is realized that the intermediary server 130 need not directly associate the subscription ID with the user. Instead, the subscription ID can be associated with a data storage area managed by the intermediary server 130 and the user device 110 may be given permission to access the data storage area associated with the subscription ID. As a result, to the extent that the utility usage information may be considered personally identifiable information if associated with a particular user, instead the utility usage information can be kept separated from the user information at the intermediary server 130. At 260, the subscription ID is sent to the user device 110.

At 270, when utility usage information is provided by the utility server 140, it may be provided in a batch file along with the utility usage information for all other subscribers.

The batch file may also include the corresponding subscription ID for each record sent in the batch file.

At 272, the intermediary server 130 can separate the records by subscription ID to provide to a user device 110 associated with that subscription ID. In accordance with some implementations the utility usage records associated with a particular subscription ID can be stored at the intermediary server 130 (or a storage device or service associated with the intermediary server 130) and the user device 110 may be provided access to retrieve the utility usage information.

At 274, the user device 110 may receive the utility usage information corresponding the subscription ID. If more than one service location and/or meter is associated with the subscription ID, the user device 110 and/or intermediary server 130 can further separate the utility usage information by service location and/or meter information.

Figure 3A:
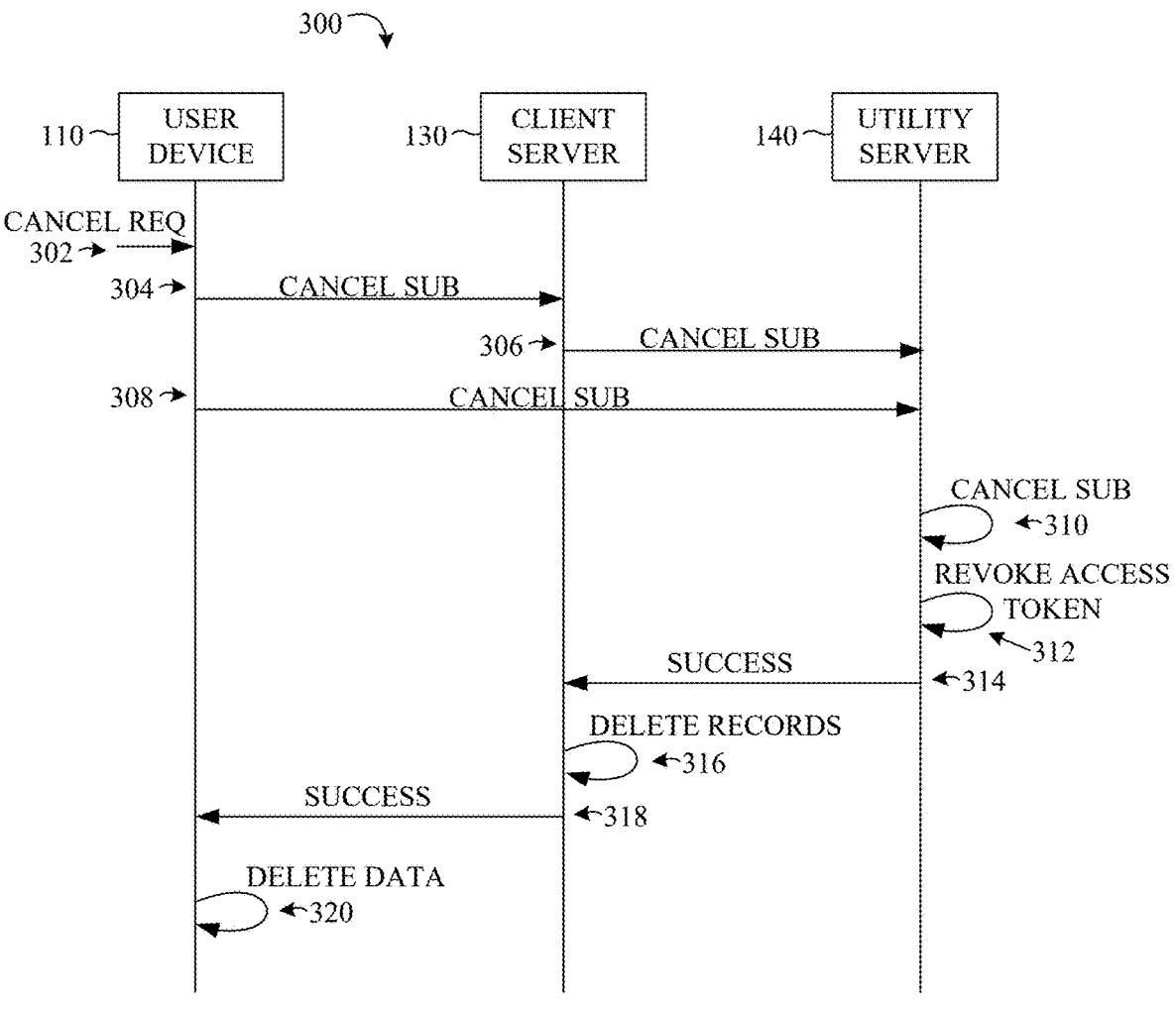
FIGS. 3A, 3B, and 3C illustrate data flows for managing a subscription to utility usage information in accordance with one or more implementations.
Figure 3B:
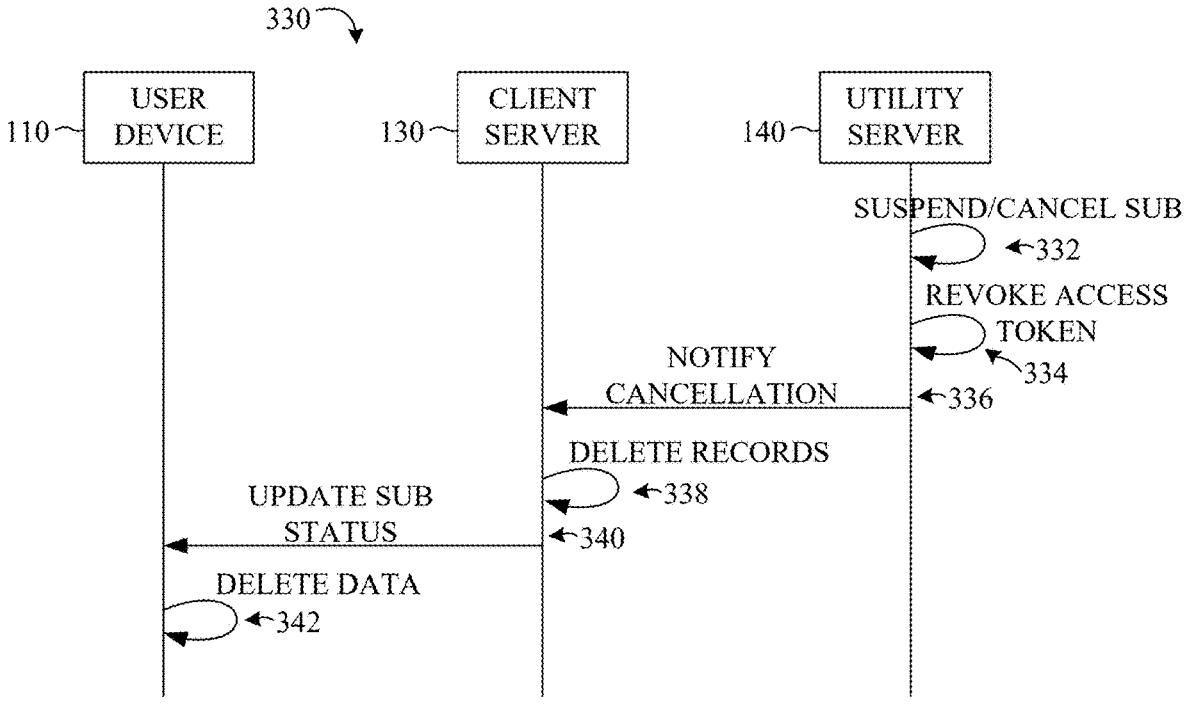
Figure 3C:
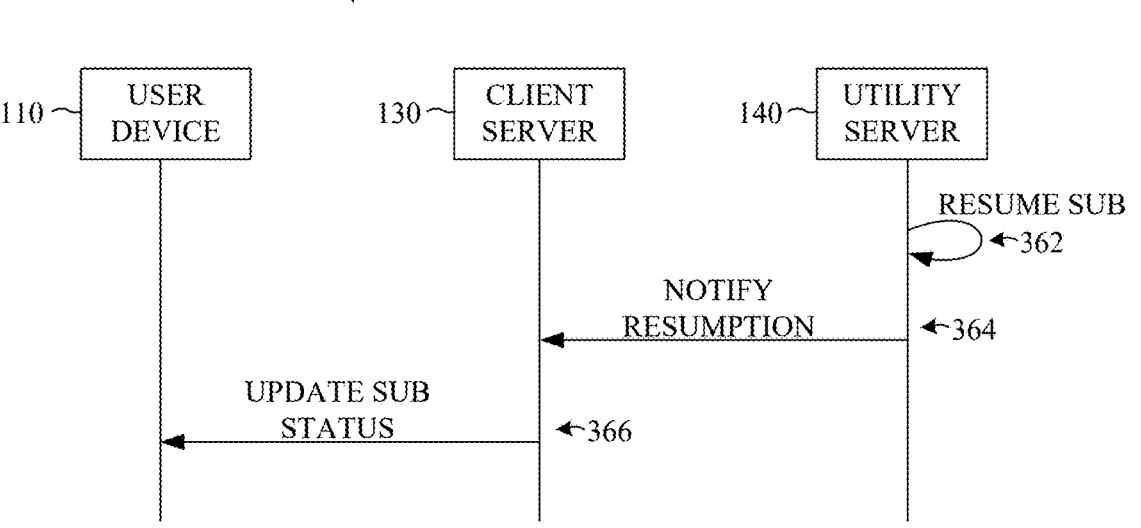

FIGS. 3A, 3B, and 3C illustrate data flow 300, data flow 330, and data flow 360, respectively. Each of these data flows deals with subscription management for the subscription to the utility usage information. The data flows 300, 330, and 360 may be between a user device 110, an intermediary server 130, and a utility server 140 for managing the subscription of the user device 110 to receive utility usage information for a customer account associated with the utility server 140 in accordance with some implementations. For the sake of simplicity, unless otherwise noted, where the description below refers to the user device 110, it should be understood that the user device 120 may be used. The intermediary server 130 may be an intermediary server such as the intermediary server 130 described above. The utility server 140 may be utility server such as the utility server 140 described above. It should be appreciated that more or fewer data exchanges between the user device 110, the intermediary server 130, and the utility server 140 may be used than those described herein. For example, some data exchanges may be optional, and some data exchanges may be repeated if, for example, the data exchange fails for whatever reason. For the sake of simplicity, unless otherwise noted, an action taken at the user device 110 should be understood to be taken by accessing an application installed on the user device 110 or a system setting or configuration of the user device 110. In some implementations the application may be an add-on application, such as installed from an application store and developed by a third-party. In other implementations the application may be a native application, such as an application provided by the device manufacturer.

FIG. 3A illustrates a data flow 300 for sending a request to cancel the subscription from the user device 110 to the intermediary server 130 or to the utility server 140. At 302, a request can be provided to the user device 110 to cancel the subscription for the utility usage subscription. In some instances, the request can be received by a user of the user device 110, while in other instances, the request may be received by an automated process on the user device 110, for example, an automated process resulting from deleting an application used for storing utility usage information.

At 304, in implementations where the cancellation request is sent to the intermediary server 130, the user device 110 sends the cancellation request to the intermediary server. Then, at 306, the cancellation request is sent from the intermediary server 130 to the utility server 140.

Alternatively, at 308, in other implementations the cancellation request may be sent from the user device 110 to the utility server 140.

At 310, the utility server 140 cancels the subscription so that it will no longer be included in the batch file. In some implementations, the utility server 140 can mark the subscription inactive for a time period before cancellation is completed. In both instances, however, the utility usage information is not included in the batch file.

At 312, the access token that was previously supplied by the utility server 140 can be revoked so as to be invalidated. Once the access token is revoked then, if the user device 110 wanted to access utility usage information, the user device 110 may need to go through the process again to obtain a new access token.

At 314, the utility server 140 can report a successful cancellation and revocation of the token to the intermediary server 130. The intermediary server 130, upon notification that the subscription is cancelled and that the access token has been revoked, can at 316, delete records associated with that subscription ID. The intermediary server 130 can also provide, at 318, a message or notification to the user device 110 that the subscription has been successfully cancelled.

At 320, the user device 110 can optionally delete data associated with the utility usage information which is collected on the user device 110.

FIG. 3B illustrates a data flow 330 for suspending or cancelling the subscription initiated at the utility server 140. At 332, a condition may be met where the utility server 140 deems it necessary to suspend or cancel the subscription. For example, if the user cancels their utility service with the utility, then as part of the utility shut off procedures, the utility server 140 may cancel the subscription. In another example, if the user is more than a threshold number of days late on their payment for utility services, the utility server 140 can initiate a suspension of the utility usage data. These considerations are not exhaustive and the utility server 140 may suspend or cancel the subscription for utility usage information for other reasons.

At 334, if the action at the utility server 140 is for cancellation (rather than suspension), the access token can be revoked by the utility server 140, such as described above. At 336, the utility server 140 may then notify the intermediary server 130 of the cancellation or suspension. In some instances, the intermediary server 130 may mark the records associated with a suspended subscription as being subject to deletion if a resumption of the subscription is not initiated within a particular time period. At 338, in some instances the intermediary server 130 may delete all records associated with that subscription ID.

At 340, the status of the subscription as being cancelled or suspended can be sent to the user device 110 from the intermediary server 130. If, for example, the subscription was suspended by the utility server 140 because of an issue with the customer account, the customer could be notified that there is an issue with the customer account. If, for example, the suspension was due to non-payment, the suspension could occur before a cutoff of the service. While the utility provider may certainly notify the customer by mail or email that the service was scheduled to be cut off, the implicit notification that comes from a suspension of the subscription also serves as another notification of an issue with the customer account.

At 342, the user device 110 can optionally delete data associated with the utility usage information which is collected on the user device 110.

FIG. 3C illustrates a data flow 360 for resuming a suspended subscription. The resuming is initiated at the utility server 140. At 362, a condition may be met where the utility server 140 deems it appropriate to resume a suspended subscription. For example, if the user's subscription was suspended due to an issue with the customer account, if the user resolves the issue with their customer account with the utility provider, the utility server 140 can initiate the resuming of the subscription.

At 364, the intermediary server 130 may be notified that the subscription is resumed or is being resumed. In some implementations, the intermediary server 130 may also obtain utility usage data for the time period that the subscription was suspended.

At 366, the intermediary server 130 may notify the user device 110 that the subscription is resumed and, in some implementations, provide utility usage data for the time period that the subscription was suspended.

FIG. 4 illustrates a flow diagram of an example process 400 for establishing a data subscription for utility usage information, in accordance with some implementations. The process 400 may be performed by one or more user devices, such as one of the user devices 110 or 120, described above with respect to FIG. 1. One or more blocks (or operations) of the process flow diagram of FIG. 4 may be performed by one or more other components and other suitable devices. Further for explanatory purposes, the blocks are described herein as occurring in serial, or linearly. However, multiple blocks of the process may occur in parallel. In addition, the blocks of the process need not be performed in the order shown and/or one or more blocks of the process need not be performed and/or can be replaced by other operations.

At block 402, process 400 may include receiving, at a device, a user request to subscribe to a usage-data sharing subscription for a third-party utility server, the user request being associated with a user device account. The user request, for example, may be received at a device associated with a user, such as described above with respect to 202 of FIG. 2A.

At block 404, process 400 may include receiving, at the device from an intermediary server, first user information. Receiving the first user information from the intermediary server may include receiving personal information known by the intermediary server, such as a token. The first user information, for example, can correspond to the information received at the user device 110, such as described above with respect to 208 of FIG. 2A.

At block 406, process 400 may include providing, from the device to the utility server, the first user information. Providing the first user information to the utility server can include providing information regarding the user of the device which was requested from the intermediary server to the utility server to indicate that the intermediary server considers the user associated with the user device to be verified, authenticated, or trustworthy. The first user information, for example, can correspond to the information sent to the utility server 140, such as described above with respect to 210 of FIG. 2A.

At block 408, process 400 may include based at least in part on a validation that the first user information corresponds to a user identity associated with the user device account, receiving a request for additional information from the utility server. The additional information may be received from the utility server after the utility server, for example, validates the first user information. As noted above, the validation can be based on a query from the utility server to the intermediary server or based on the use of a public key to decrypt a token which is used as the first user information. The additional information may correspond to the account-identifying information questions received at the user device 110, such as described above with respect to 216 of FIG. 2A.

At block 410, process 400 may include providing, by the device and to the utility server, the additional information for verifying that the user identity is associated with a utility account associated with the utility server. Personal information for the user can be provided by the device to the utility server as the additional information, where the additional information corresponds to personal information of the user that can be used by the utility server to verify that the additional information corresponds to the customer of the utility provider. The additional information provided by the device may correspond to the account-identifying information responses sent to the utility server 140, such as described above with respect to 218 of FIG. 2A.

At block 412, process 400 may include based on a verification of the utility server that the device corresponds to the user identity, receiving, from the utility server, an authorization for the usage-data sharing subscription corresponding to the user identity. The device can receive from the utility server an authorization to obtain the subscription for receiving utility usage information associated with a customer account of the utility server, the customer account corresponding to the user identity of the user associated with the device. The authorization provided by the utility server, for example, may correspond to the authorization code received by the user device 110 from the utility server 140, such as described above with respect to 228 of FIG. 2A; the authorization provided by the utility server, in another example, may correspond to the access token received by the user device 110 from the utility server 140 by way of the intermediary server 130, such as described above with respect to 234 and 238 of FIG. 2A; and/or the authorization provided by the utility server, in another example, may correspond to the subscription information received by the user device 110 from the utility server 140 by way of the intermediary server 130, such as described above with respect to 256 and 260 of FIG. 2B.

At block 414, process 400 may include receiving, at the device, utility usage information for the utility account. The utility usage information can be received by the device from the intermediary server. As discussed above the intermediary server may receive the subscription data from the utility server for all subscriptions. Then, the intermediary server may filter the subscription data based on various subscription IDs, including the subscription ID associated with the device. The device may then obtain the utility usage data from the intermediary server either directly from the intermediary server or by accessing a storage space associated with intermediary server. The receiving utility usage information may correspond to the subscription data received by the user device 110, such as described with respect to 274 of FIG. 2B.

FIG. 5 illustrates a flow diagram of an example process 500 for establishing a data subscription for utility usage information, in accordance with some implementations. The process 500 may be performed by one or more user devices, such as the user device 110 and/or 120, described above with respect to FIG. 1. One or more blocks (or operations) of the process flow diagram of FIG. 5 may be performed by one or more other components and other suitable devices. Further for explanatory purposes, the blocks are described herein as occurring in serial, or linearly. However, multiple blocks of the process may occur in parallel. In addition, the blocks of the process need not be performed in the order shown and/or one or more blocks of the process need not be performed and/or can be replaced by other operations.

At block 502, process 500 may include receiving, at a device, a subscription request from a user identity to subscribe to a usage-data sharing subscription for a utility server. The subscription request, for example, may be received at a device associated with a user identity, such as described above with respect to 202 of FIG. 2A.

At block 504, process 500 may include responsive to receipt of the subscription request, sending, from the device and to the utility server, first authentication information corresponding to the user identity. Sending the first authentication information corresponding to the user identity to the utility server can include providing information regarding the user identity so that the utility server can use the first authentication information to authenticate that the user identity is known to and has an account with the intermediary server, and that the intermediary server considers the user associated with the user device to be verified, authenticated, or trustworthy. The first authentication information, for example, can correspond to the information sent to the utility server 140, such as described above with respect to 210 of FIG. 2A.

At block 506, process 500 may include responsive to receipt of an account verification request from the utility server, providing, from the device and to the utility server, second information for verifying that the user is associated with a utility account associated with the utility server. The second information for verifying that the user is associated with a utility account at the utility server may be personal information corresponding to the user identity that is known to the utility. For example, this personal information may include identifying information such as one or more of a partial portion of a social security number, a driver's license or state government issued number, phone numbers, email addresses, billing information, payment information, and so forth. The utility server can use this information to determine if the supplied information matches their customer by matching the provided information to their customer information. The second information provided by the device may correspond to the account-identifying information responses sent to the utility server 140, such as described above with respect to 218 of FIG. 2A.

At block 508 process 500 may include responsive to receipt of a verification request, sending, from the device to the utility server, third information for verifying that the device corresponds to the user. The third information may correspond to the verification code provided by the user device 110, such as described above with respect to 226 of FIG. 2A.

At block 510 process 500 may include receiving, from the utility server, an authorization for the usage-data sharing subscription. The authorization received from the utility server, for example, may correspond to the authorization code received by the user device 110 from the utility server 140, such as described above with respect to 228 of FIG. 2A; the authorization received from the utility server, in another example, may correspond to the access token received by the user device 110 from the utility server 140 by way of the intermediary server 130, such as described above with respect to 234 and 238 of FIG. 2A; and/or the authorization received from the utility server, in another example, may correspond to the subscription information received by the user device 110 from the utility server 140 by way of the intermediary server 130, such as described above with respect to 256 and 260 of FIG. 2B.

At block 512 process 500 may include receiving, at the device, utility usage information based on the authorization. The receiving utility usage information may correspond to the subscription data received by the user device 110, such as described with respect to 274 of FIG. 2B.

It should be understood also that the flow of FIG. 4 and/or FIG. 5 can be provided from the perspective of another device, such as the intermediary server 130 or the utility server 140. For example, a second device, such as the intermediary server 130, may, in response to a first request from a first device, such as a user device 110, for first validation information, generate and provide a token related to a user account associated with the second device, where the user account is logged into the first device. In response to a second request from a utility server, the second request including the token, the second device can determine that the token corresponds to the user account and provide verification to the utility server that the token corresponds to the user account. The second device may receive, from the utility server, an access token corresponding to the user account and providing the access token to the first device. In response to a subscription request at the utility server, the second device may then receive a subscription ID corresponding to the user account, provide the subscription ID to the first device, and associate the subscription ID with the access token and not the user account. The second device may receive from the utility server, utility usage information corresponding to the subscription ID.

In some implementations, the first request is received from an application running on the first device which was provided by a manufacturer of the first device, wherein the manufacturer of the first device is associated with the second device. In some implementations, the second device may receive the utility usage information in a batch including multiple subscription IDs including the subscription ID, separate the utility usage information by subscription ID, and provide the utility usage information for access by the first device, for example in a storage location associated with the second device.

In some implementations, the second device may receive, from the utility server in the batch, a message indicating a cancellation of a subscription associated with the subscription ID and access token, delete utility usage information corresponding to the subscription ID, and provide an indication to the first device of the cancellation. In some implementations, the second device may also receive a request to cancel the subscription associated with the subscription ID from the first device, provide the request to cancel the subscription to the utility server, and receive the message indicating the cancellation of the subscription in response to providing the request to cancel the subscription. The indication of cancellation may be provided to the first device in response to a request for the utility usage information. In some implementations, after suspension of a subscription, the second device may receive, from the utility server in the batch, a notification of resumption of the subscription.

In some implementations, the second device may receive, prior to receiving the subscription ID and from the utility server, a list of service locations associated with the subscription request. The second device may also receive a selection of a service location from the first device from the list of service location and provide the selection of the service location to the utility server, where the subscription ID corresponds to the selected service location.

In some implementations, a user identity associated with the user account may not have an active login with a customer portal of the utility server.

As described above, one aspect of the present technology is the gathering and use of data available from specific and legitimate sources for providing subscription access to utility usage information related to a specific user or customer account. The present disclosure contemplates that in some instances, this gathered data may include personal information data that uniquely identifies or can be used to identify a specific person. Such personal information data can include voice data, demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for operating an electronic device (e.g., user device) to provide utility usage information to the electronic device. Accordingly, use of such personal information data may facilitate transactions (e.g., on-line transactions). Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of operating a user device to provide utility information, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 6:
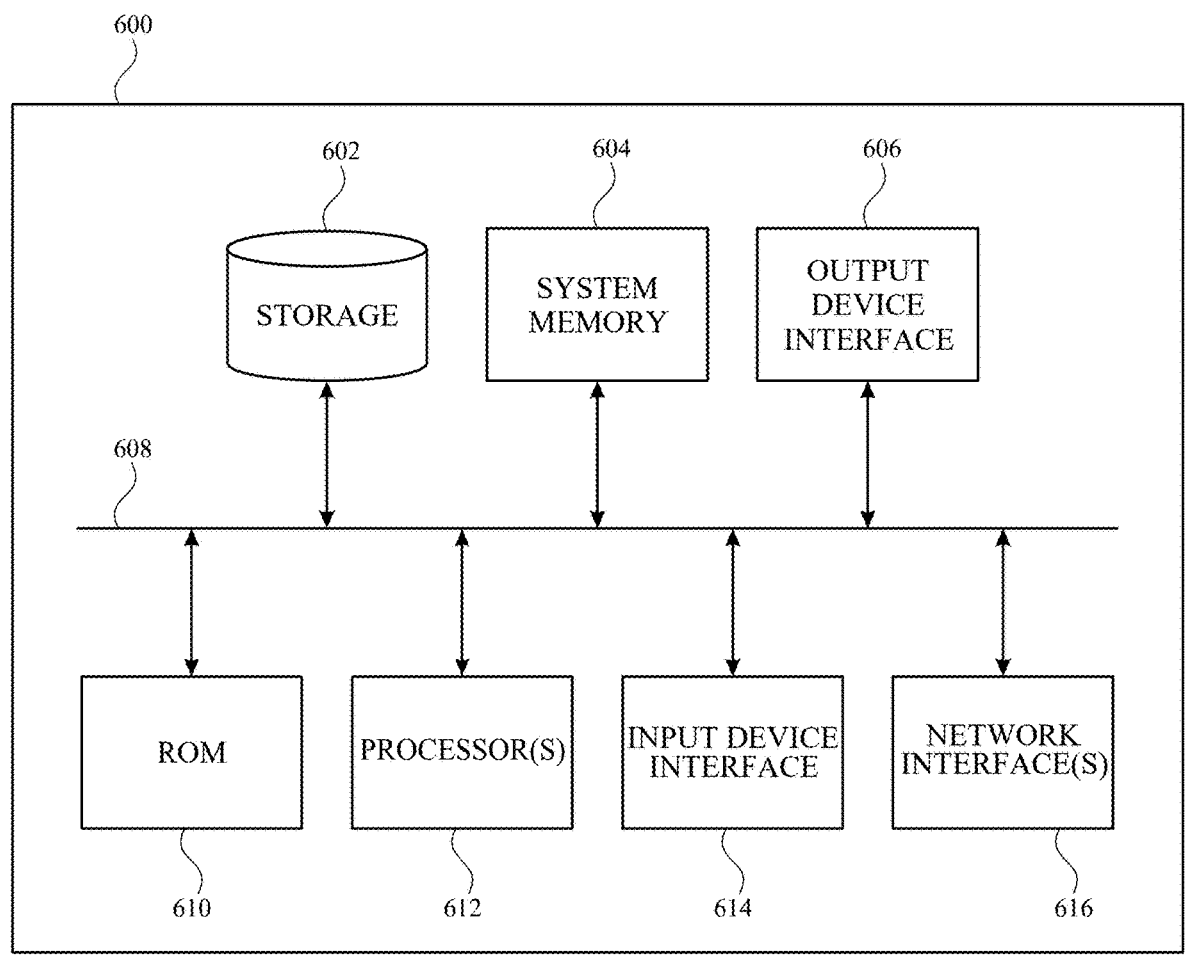
FIG. 6 illustrates an example electronic system with which aspects of the subject technology may be imple-mented in accordance with one or more implementations.

FIG. 6 illustrates an electronic system 600 with which one or more implementations of the subject technology may be implemented. The electronic system 600 can be, and/or can be a part of, one or more of the user device 110, user device 120, intermediary server 130, and/or utility server 140. The electronic system 600 may include various types of computer readable media and interfaces for various other types of computer readable media. The electronic system 600 includes a bus 608, one or more processing unit(s) 612, a system memory 604 (and/or buffer), a ROM 610, a permanent storage device 602, an input device interface 614, an output device interface 606, and one or more network interfaces 616, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a flash drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 612 may need at runtime. In one or more implementations, the processes of the subject disclosure are stored in the system memory 604, the permanent storage device 602, and/or the ROM 610. From these various memory units, the one or more processing unit(s) 612 retrieves instructions to execute and data to process in order to execute the processes of one or more implementations.

The bus 608 also connects to the input and output device interfaces 614 and 606. The input device interface 614 enables a user to communicate information and select commands to the electronic system 600. Input devices that may be used with the input device interface 614 may include, for example, alphanumeric keyboards and pointing devices (also called "cursor control devices"). The output device interface 606 may enable, for example, the display of images generated by electronic system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 608 also couples the electronic system 600 to one or more networks and/or to one or more network nodes, through the one or more network interface(s) 616. In this manner, the electronic system 600 can be a part of a network of computers (such as a LAN, a wide area network ("WAN"), or an Intranet, or a network of networks, such as the Internet. Any or all components of the electronic system 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, struc- ture, sequence, and organization of instructions can vary significantly without varying the underlying logic, function, processing, and output.

While the above discussion primarily refers to micropro- cessor or multi-core processors that execute software, one or more implementations are performed by one or more inte- grated circuits, such as ASICs or FPGAs. In one or more implementations, such integrated circuits execute instruc- tions that are stored on the circuit itself.

Those of skill in the art would appreciate that the various illustrative blocks, modules, elements, components, meth- ods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design con- straints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simul- taneously. In one or more implementations, multitasking and parallel processing may be advantageous. Moreover, the separation of various system components in the implemen- tations described above should not be understood as requir- ing such separation in all implementations, and it should be understood that the described program components and systems can generally be integrated together in a single software product or packaged into multiple software prod- ucts.

As used in this specification and any claims of this application, the terms "base station", "receiver", "com- puter", "server", "processor", and "memory" all refer to electronic or other technological devices. These terms exclude people or groups of people. For the purposes of the specification, the terms "display" or "displaying" means displaying on an electronic device (e.g., user device).

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being pro- grammed to monitor and control the operation or the pro- cessor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implemen- tations, one or more implementations, an embodiment, the embodiment, another embodiment, some implementations, one or more implementations, a configuration, the configu- ration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedi- cated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
receiving, at a device, a user request to subscribe to a usage-data sharing subscription for a third-party utility server, the user request being associated with a user device account;
receiving, at the device from an intermediary server, first user information;
providing, from the device to the third-party utility server, the first user information;
based at least in part on a validation that the first user information corresponds to a user identity associated with the user device account, receiving a request for additional information from the third-party utility server;
providing, by the device and to the third-party utility server, the additional information for verifying that the user identity is associated with a utility account associated with the third-party utility server, wherein the providing the additional information comprises:
providing, at the device, input elements for receiving personal information corresponding to the utility account associated with the user identity, and
submitting the personal information to the third-party utility server, wherein the third-party utility server validates that the personal information corresponds to the utility account associated with the third-party utility server;
providing, by the device and to the third-party utility server, a verification element back to the third-party utility server via a first communication channel, wherein prior to providing the verification element back to the third-party utility server, the verification element is received from the third-party utility server by a second different communication channel, wherein the third-party utility server uses the verification element to verify that the device corresponds to the user identity;
based on the verification of the third-party utility server that the device corresponds to the user identity, receiving, from the third-party utility server, an authorization for the usage-data sharing subscription corresponding to the user identity; and
receiving, at the device, utility usage information for the utility account.

2. The method of claim 1, wherein the utility usage information is sourced from a batch file provided by the third-party utility server, wherein the batch file includes utility usage information for a plurality of subscription IDs, wherein the utility usage information is filtered based on a subscription ID associated with the usage-data sharing subscription.

3. The method of claim 1, wherein the first user information comprises a private token.

4. The method of claim 3, wherein the private token is issued by a second server of a service provider associated with the device, wherein the private token is validated by the third-party utility server.

5. The method of claim 4, wherein the private token is validated by the third-party utility server through a communication with the second server.

6. The method of claim 1, wherein the request for additional information includes pre-defined questions provided by the third-party utility server for verification of the user identity.

7. The method of claim 1, wherein the user identity does not have an active login with a customer portal of the third-party utility server.

8. The method of claim 1, further comprising:
receiving an access token, the access token originating from the third-party utility server.

9. The method of claim 1, further comprising:
receiving, at the device, a request to cancel the usage-data sharing subscription; and
requesting, at the device to the intermediary server or the third-party utility server, to cancel the usage-data sharing subscription, wherein when the request is to the intermediary server, the intermediary server requests and receives cancellation from the third-party utility server.

10. The method of claim 9, further comprising:
deleting stored utility usage information previously received.

11. A non-transitory machine-readable medium comprising instructions that, when executed by one or more processors, cause the one or more processors to perform operations comprising:
receiving, at a device, a subscription request from a user identity to subscribe to a usage-data sharing subscription for a utility server;
responsive to receipt of the subscription request, sending, from the device and to the utility server, first authentication information corresponding to the user identity;
responsive to receipt of an account verification request from the utility server:
providing, at the device, input elements for receiving personal information corresponding to a utility account associated with the user identity;
providing, from the device and to the utility server, second information corresponding to the personal information for verifying that the user identity is associated with a utility account associated with the utility server, wherein the utility server validates that the personal information corresponds to the utility account associated with utility server;
responsive to receipt of a verification request, sending, from the device to the utility server, third information for verifying the device, the third information corresponding to a verification element sent to the utility server via a first communication channel, wherein the verification element is received as part of the verification request from the utility server by a second different communication channel, wherein the utility server uses the verification element to verify that the device corresponds to the user identity;
receiving, from the utility server, an authorization for the usage-data sharing subscription; and
receiving, at the device, utility usage information based on the authorization.

12. The non-transitory machine-readable medium of claim 11, wherein the utility server verifies the first authentication information, the second information, and the third information.

13. A device comprising:
a processor; and
a computer-readable memory storing instructions, the instructions configured to cause the processor to:

receive a user request to subscribe to a usage-data sharing subscription for a third-party utility server, the user request being associated with a user device account;

receive, from an intermediary server, first user information;

provide, to the third-party utility server, the first user information;

based at least in part on a validation that the first user information corresponds to a user identity associated with the user device account, receive a request for additional information from the third-party utility server;

provide, to the third-party utility server, the additional information for verifying that the user identity is associated with a utility account associated with the third-party utility server, wherein to provide the additional information comprises:

providing, at the device, input elements for receiving personal information corresponding to the utility account associated with the user identity, and submitting the personal information to the third-party utility server, wherein the third-party utility server validates that the personal information corresponds to the utility account associated with the third-party utility server;

provide, to the third-party utility server, a verification element back to the third-party utility server via a first communication channel, wherein prior to providing the verification element back to the third-party utility server, the verification element is received from the third-party utility server by a second different communication channel, wherein the third-party utility server uses the verification element to verify that the device corresponds to the user identity;

based on the verification of the third-party utility server that the device corresponds to the user identity, receive, from the third-party utility server, an authorization for the usage-data sharing subscription corresponding to the user identity; and receive utility usage information for the utility account.

14. The device of claim 13, wherein the utility usage information is sourced from a batch file provided by the third-party utility server, wherein the batch file includes utility usage information for a plurality of subscription IDs, wherein the utility usage information is filtered based on a subscription ID associated with the usage-data sharing subscription.

15. The device of claim 13, wherein the first user information comprises a private token, wherein the private token is issued by a second server of a service provider associated with the device, wherein the private token is validated by the third-party utility server.

16. The device of claim 15, wherein the private token is validated by the third-party utility server through a communication with the second server.

17. The device of claim 15, wherein the request for additional information includes pre-defined questions provided by the third-party utility server for verification of the user identity.

18. The device of claim 13, wherein the user identity does not have an active login with a customer portal of the third-party utility server.

19. The device of claim 13, wherein the instructions are further configured to cause the processor to:

receive, at the device, a request to cancel the usage-data sharing subscription; and request, at the device to the intermediary server or the third-party utility server, to cancel the usage-data sharing subscription, wherein when the request is to the intermediary server, the intermediary server requests and receives cancellation from the third-party utility server.

20. The device of claim 19, wherein the instructions are further configured to cause the processor to:

delete stored utility usage information previously received.

* * * * *